Patented Aug. 19, 1952

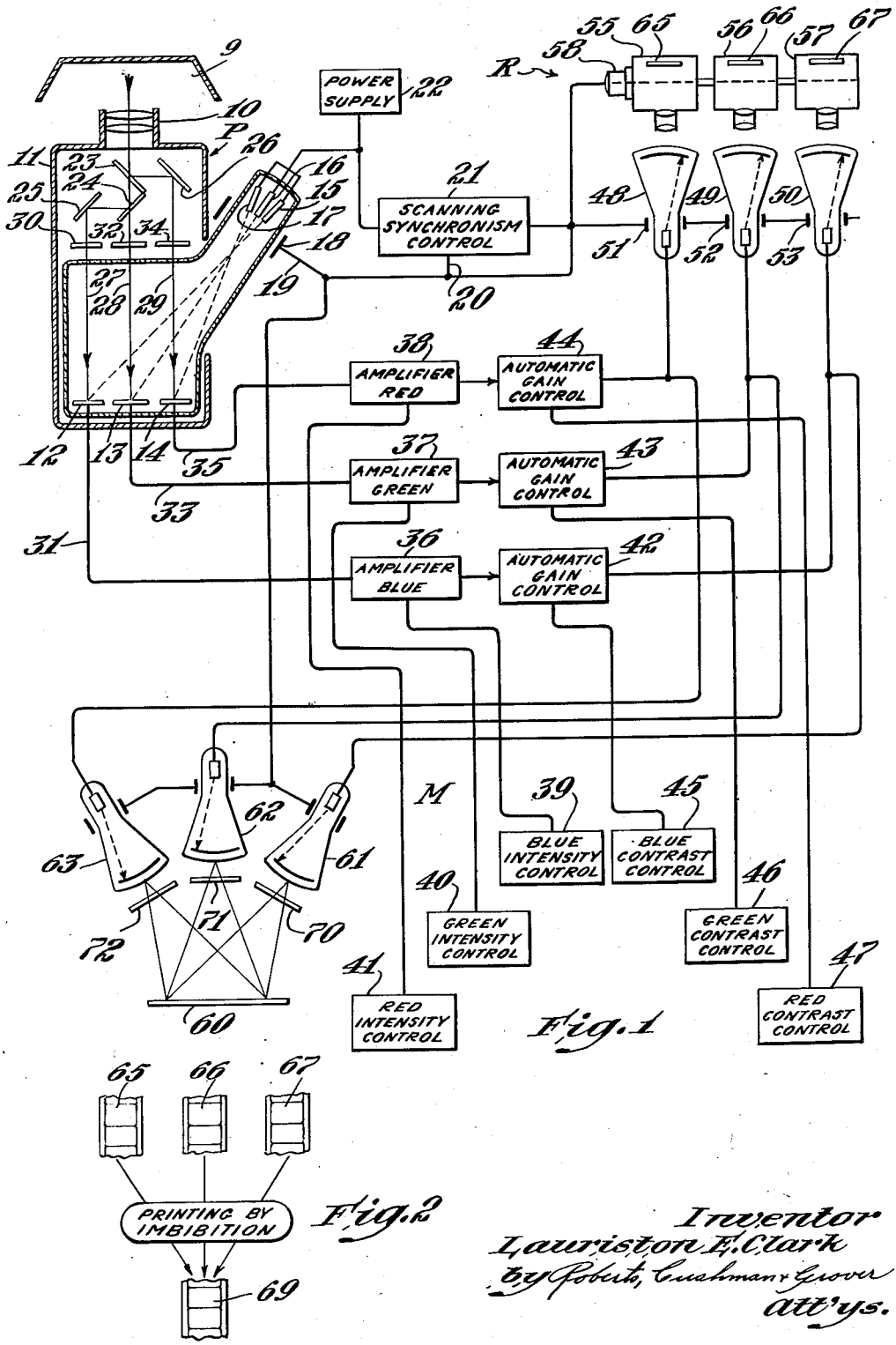

2,607,845

UNITED STATES PATENT OFFICE 2,607,845

MOTION-PICTURE PHOTOGRAPHY AND MONITORING SYSTEM FOR COLOR TELEVISION

Lauriston E. Clark, Los Angeles, Calif., assignor to Technicolor Motion Picture Corporation, Los Angeles, Calif., a corporation of Maine Application August 20, 1947, Serial No. 769,656

4 Claims. (Cl. 178—5.2)

The production of motion picture films by conventional photographic apparatus involves a number of major difficulties. One of these difficulties is the inability of the supervising personnel to view the scene being filmed exactly as it is recorded upon the film in order to make continuous adjustments of lighting and exposure to obtain the desired pictorial effect on the film. Another difficulty, especially in color motion picture photography, is the necessity to light the scene with very high intensity lamps because of the comparatively low intensity of the exposure light reaching the individual recording emulsions. These high light levels are not only uneconomical but cause discomfort to the actors and also abnormal appearances, for example contracted pupils in close-up scenes. Yet another disadvantage of the present system of motion picture photography is the necessity of preventing the noise of motion picture camera and associated equipment from reaching the microphone, which requires heavy and cumbersome sound proofing provisions.

It is the principal object of this invention to provide an improved system of motion picture photography which overcomes the foregoing difficulties and disadvantages of the previously known systems of motion picture photography.

Another object of this invention is to provide an improved method and apparatus for motion picture black and white or color photography which enables the supervisors to view the scene essentially as it will appear to the ultimate audience and so to adjust or monitor during the actual filming the photographic recordation and scene representation that the intended effect is achieved.

Additional objects of this invention are to provide an improved system of color motion picture photography which has greatly increased sensitivity for all colors of the scene so that the light levels on the set can be greatly reduced, and which permits the recording of a plurality of color aspects of the scene directly upon identical, non-color sensitized film of high sensitivity.

Still another important object of this invention is to provide a novel system of color photography wherein the noise producing components of the photographic equipment are located at any desirable distance from the set so that the scene is free from sound interference.

In its principal aspect, the system according to the invention provides photographic records through the scanning of a scene by a television pick-up device such as the image orthicon tube which is many times more sensitive to light than film in a conventional motion picture camera. The video output signal from the image orthicon tube representing the scanned image of the scene may be connected to an amplifier having an adjustable manual gain control together with an adjustable automatic gain control to provide any reasonable degree of straight line amplification, if desired combined with signal expansion or contraction. The output of the amplifier is applied to television receiving and reproducing apparatus including a high intensity television cathode ray tube remotely positioned from the scene to be photographed. This receiving tube is associated with a suitable motion picture camera synchronized with the scanning frequency of both, image orthicon and receiving tubes, to record the televised image of the scene as appearing upon the screen of the receiving tube. An additional television cathode ray tube effectively identical to the remotely positioned cathode ray receiving tube and scanned in synchronism therewith may also be connected to the output from the amplifier and positioned at a monitoring location, to enable the supervisor to view the scene as it appears in transmitted form for recording by the remotely positioning cameras. Manual gain controls for the amplifier together with controls for the degree of automatic gain control of the amplifier may also be positioned at the monitoring location and the supervisor, by adjusting these controls may correspondingly regulate the overall intensity and contrast characteristics of the scene as photographically recorded. The transmission links between taking, recording and monitoring components can be designed without any regard to frequency band width so that the transmission characteristics can be selected to provide any desired definition.

In another aspect of the invention the system according to the invention may be modified for use in color motion picture photography. For that purpose, the image orthicon tube is provided with a plurality of image receiving targets, a similar number of target scanning electron beams, a light splitter for splitting the light from the scene into a similar number of light beams, and appropriate color filters for differentiating the split light beams. The signal from each of the orthicon tube targets representing different color aspects of the scene may be individually amplified and controlled as outlined above or may be applied directly to a similar number of remotely positioned television receivers including high intensity television cathode ray tubes. The images upon the screens of each of the remotely positioned cathode ray tubes representing different color aspects of the scene, corresponding to the above mentioned filters, are recorded upon the films of a similar number of exactly synchronized motion picture cameras associated therewith. These films may have identical non-color sensitized, highly sensitive emulsions. From the plurality of films exposed in the cameras and representing different color aspects of the scene to be photographed a single color film may be made by any suitable color process such as the dye imbibition technique.

In monitoring the production of motion picture color films as described above, a number of monitoring cathode ray tubes equal to the number of color aspects may be used to project through suitable color filters onto a single screen a color image of the scene. Assuming that the color filters of these monitoring tubes are selected to have transmission characteristics which match the various color selective steps of the photographic reproduction process from the taking of the camera tube images through the imbibition printing process to the final projection, the scene will be viewed by the monitor or production director substantially in the colors as it will be finally seen by the audience. By providing each of the color aspect amplifiers with the conventional controls including manual gain control and adjustable automatic gain control, at the monitors location, it is possible to control and adjust the intensity level and contrast characteristics of each color aspect and thus the complete color rendition.

Further objects and aspects of this invention will be apparent with reference to the following description of a specific embodiment, which refers to a drawing in which:

Fig. 1 is a diagrammatic illustration of a motion picture photography system according to this invention as adapted to the recording of different color aspects of a scene upon a plurality of films; and Fig. 2 is the diagram of a process for producing a final color positive from the plurality of films representing different color aspects, obtained with the system according to Fig. 1.

Referring to Fig. 1, the numeral 9 designates the scene to be photographed. Positioned at a suitable vantage point to scan the scene through a suitable lens system 10 is a television pick-up device P which may include a tube 11 of the image orthicon type modified to include three separate image receiving targets 12, 13 and 14 adapted to be scanned by three electron beams from the cathode guns 15, 16 and 17, deflected by the synchronized deflection coil 18. The deflection coil 18 is connected by lines 19 and 20 to the deflection voltage output of a scanning synchronism control circuit 21 adapted to be energized from the power supply circuit 22 as are also the cathode electron guns 15, 16 and 17. The light image carrying light beam from scene 9 and lens system 10 is split into three component beams by a suitable image splitter of conventional type such as the half-silvered mirrors 23, 24 and mirrors 25 and 26 arranged as shown to provide the three parallel light beams 27, 28 and 29. The light beam 27 is passed through a blue color filter 30 so that the image produced on the target 12 resulting in a video voltage output in the line 31, is representative of the blue aspect of the scene. Similarly, the light beam 28 is passed through a green color filter 32 and the light beam 29 through a red color filter 34 so that the video voltage signals produced in lines 31, 33 and 35 are each representative of different color aspects of the scene to be photographed.

Although the arrangement according to Fig. 1 has a television image pick-up device providing three video voltage signals representative of three color aspects of the scene to be photographed, it should be understood that this invention is not limited to the use of a three color aspect system employing a television tube with three scanning targets since such arrangement may be readily modified for recording two, four or any desired number of color aspects simply by providing the appropriate number of image receiving targets in the image orthicon tube in proper relation to an appropriate optical beam splitting system. It is further understood that a separate tube can be employed for each color aspect or group of aspects.

The video voltage signals in lines 31, 33, and 35 representative of different color aspects of the scene 9, have an amplitude proportionate to the light intensity of the particular part of the scene being scanned. Such voltage signals may not be of sufficient average amplitude for energizing directly a television picture-receiving tube and therefore amplifiers 36, 37 and 38 may be provided for the respective ones of the video signals in lines 31, 33, and 35 to obtain a desired amplitude level for proper energization of the television receiving circuits and picture tubes. It should here be pointed out that the frequency band width of the amplifiers 36, 37 and 38 and all connecting lines may be made as wide as desired since there is no radio transmission involved; therefore, scanning definition may be as high as desired in order to obtain sharply defined television images.

The amplifiers 36, 37 and 38 are associated with manual gain controls 39, 40 and 41 respectively, which may be remotely positioned at a monitoring location to be later described. Such manual gain controls may, if desired, be of the simple potentiometer type in the input circuits of the amplifiers. Change of the amplifier output or the amplified signal level by proper adjustment of the potentiometer manual gain control will result in a higher or lower average level of intensity for the scene as reproduced on a television picture-receiving tube connected to the output of the amplifier.

Automatic gain control means 42, 43 and 44 are also provided for the respective amplifiers 36, 37 and 38. These may be separate circuits as shown by the block diagram, or they may be incorporated directly into the amplifier circuit as will be understood by those versed in the art. The automatic gain control circuits 42, 43 and 44 should be of the conventional type effecting either expansion or contraction of the amplified signal amplitude range and should be provided with controls 45, 46 and 47 to enable the degree of expansion or contraction to be adjusted. The controls 45, 46 and 47 should be of the type which adjusts the automatic gain control without expansion or contraction response to variations of the amplitude of the input video signal so that straight-line amplification may be obtained. The adjusting means 45, 46 and 47 for the automatic gain controls are remotely positioned at a monitoring location, together with control 39, 40, 41 to facilitate their manipulation.

Automatic gain control circuits, when adjusted to expand the amplified signal amplitude range, effectively increase the amplifier gain when high amplitude signals are applied thereto and correspondingly reduce the amplifier gain when low amplitude signals are applied thereto. Conversely, these circuits, when adjusted to contract the amplified signal amplitude range, effectively increase the amplifier gain when low amplitude signals are applied thereto and decrease the amplifier gain when high amplitude signals are applied thereto. Stated in other words, the overall effect of expansion is to increase the amplitude range of the amplified signal in proportion to the original signal amplitude range and the overall effect of contraction is to decrease the amplitude range of the amplified signal in proportion to the original signal amplitude range. When such automatic gain control circuits are employed in the system according to this invention, adjustment to expand to a selected degree the amplitude range of the amplified signal functions to increase the contrast of the video signal obtained from the television pickup tube, while adjustment to contract to a selected degree the amplitude range of the signal functions to decrease the contrast of the video signal. In combination with the manual gain control at 39, 40, 41, adjustment of the automatic gain control at 45, 46, 47 provides all possible intensity level and contrast controls, including level control without contrast change, and contrast control without change of average intensity level.

The amplified signals as obtained from the amplifier outputs controlled in the foregoing manner are applied in conventional manner to a recording component R containing television receiving image cathode ray tubes 48, 49 and 50. The scanning deflection coils 51, 52 and 53 of the picture tubes 48, 49 and 50 are connected together and to the scanning voltage output from the scanning synchronism control circuit 21 so that the picture receiving tubes 48, 49 and 50 will operate in exact synchronism with the television pickup tube 11. Having in mind the function of filters 30, 32, 34, the images appearing on the respective screens of the picture tubes 48, 49 and 50 represent three color aspects of the scene 9.

Motion picture camera apparatus 55, 56 and 57 is associated with the tubes 48, 49, 50 for example as shown in Fig. 1 to photograph the images appearing on the screens of these picture tubes. The cameras operate in synchronism with the scanning speed of the television pickup and receiving tubes. In order to simplify the drawing, the cameras 55, 56 and 57 are shown to be driven from a single rotary shaft connected to a motor 58 diagrammatically shown to be connected and controlled as to speed by the scanning synchronism control 21. In actual operation it may be more practical to drive the respective cameras individually in order to facilitate the exact synchronization of their shutter action with the scanning frequency of each of the picture tubes 48, 49 and 50.

In view of the fact that the images appearing on each of the picture tubes 48, 49 and 50 are already selectively representative of different color aspects of the scene 9 to be photographed, the cameras 55, 56 and 57 may be operated with highly sensitive non-color sensitized films of uniform characteristics. Also, since the picture tubes 48, 49 and 50 can be of identical construction, it will be apparent that the images on their screens are of uniform quality so that the photographic characteristics of the films 55, 56 and 57 may be accurately matched.

It will be understood that the images on the screens of tubes 48, 49, 50 may be positive or negative, with the films in cameras 55, 56, 57 recording negatives or positives respectively. If it is desired to obtain positives as original or first photographic records, conventional apparatus for changing the image sign are provided. For example an additional video amplifier stage or a polarity reversing detector may for that purpose be incorporated in amplifiers 36, 37, 38, which will then also contain conventional blanking circuits for suppressing the high intensity return lines of the inverted image.

The system described permits the use of a monitoring component M with a viewing screen 60 on which the scene to be photographed may be presented essentially as it is imaged in cameras 55, 56 and 57, or as it will ultimately appear on the screen of the motion picture theatre. In order to achieve this result, television picture-receiving tubes 61, 62 and 63 are connected in parallel with the television picture-receiving tubes 48, 49 and 50 and are remotely positioned at a monitoring location. The monitoring picture-receiving tubes 61, 62 and 63 may be arranged in the manner shown additively to project their images in register upon the monitoring screen 60. With such monitoring equipment, a supervising operator viewing the image on the monitoring screen 60, may adjust the amplifier controls 39—41 and 45—47 to control the image intensity and contrast and the color rendition as it will result from the photographic records taken by the cameras 55, 56 and 57. The production director is thus enabled to suggest changes such as in coloring or lighting of the scene 10, or in positioning of the television pickup tube 11 to obtain any desired effect of reproduction of the scene.

The exposed films from the cameras 55, 56 and 57, representing different color aspects of the scene being photographed, may be combined and reproduced by any suitable color process known for that purpose. One such process is shown diagrammatically in Fig. 2 of the drawing in which the respective film negatives 65, 66 and 67 from the cameras 55, 56 and 57 are combined to produce a color film 69 by means of the well known so-called dye imbibition process. According to this process, the negative films 65, 66 and 67 are printed on matrix films which are processed to provide positives in the form of gelatin relief matrices. These matrices are loaded with appropriate subtractive dyes which are then transferred to a blank film which, after completed dye transfer, constitutes the final positive film 69.

By properly selecting the color filters 70, 71 and 72 in front of the respective monitoring tubes 61, 62 and 63, in relation to the characteristics of the taking filters 30, 32, 34, of the printing dyes, and of the projecting components, the monitoring image appearing on the screen 60 may be presented essentially in the colors of the finally projected picture.

It will be understood that the above described system can be used, with a single tube in each component, for making black and white motion pictures, although some of the features of the system, not utilized in the black and white technique, are particularly advantageous in color motion picture photography, as will be evident from the above described embodiment of the invention.

The provision of a television pickup tube component located on the scene to transmit video signals to a remotely positioned moving picture camera component, through the medium of controllable amplifiers, overcomes the difficulties previously mentioned by enabling the camera component to be remotely positioned and by enabling a supervisor to monitor the scene as it will appear in reproduction.

It will be evident that instead of a single pickup tube several such tubes, for example one for each color aspect can be used and that, on the other hand, the monitor component may be constructed with a single color television tube.

It should be understood that the present disclosure is for the purpose of illustration only and that this invention includes all modifications and equivalents which fall within the scope of the appended claims.

I claim:

1. A system for making color motion picture film which comprises a multibeam television camera including a lens system, means for dividing the image carrying light beam emerging from said lens system directed at a scene, into a plurality of component beams, a plurality of light sensitive electron screen elements for translating light energy into video signals, means for scanning said screen elements with a plurality of respective electron beams in synchronism, and means for focusing said component beams through a plurality of different color filters upon respective ones of said screen elements; a plurality of television reproducers each having screen means for exposure to a camera; means for operating each of said reproducers in synchronism with the others from a respective one of said video signals; motion picture camera means having recording areas each associated with a respective one of said reproducers for recording on film the image on said screen means of the respective reproducer representing one of the different color aspects of the scene to be photographed; and means for supplying synchronizing energy pulses to said television camera, said reproducers and said camera means.

2. A system for making color motion picture film which comprises a multibeam television camera including a lens system, means for dividing the image carrying light beam emerging from said lens system directed at a scene into a plurality of component beams, a plurality of light sensitive electron screen elements for translating light energy into video signals, means for scanning said screen elements with a plurality of respective electron beams in synchronism, and means for focusing said component beams through a plurality of different color filters upon respective ones of said screen elements; a plurality of television reproducers each having screen means for exposure to a camera; means for operating each of said reproducers in synchronism with the others from a respective one of said video signals; motion picture camera means having recording areas each associated with a respective one of said reproducers for recording on film the image on said screen means of the respective reproducer representing one of the different color aspects of the scene to be photographed; a monitoring television receiver having screen means for visual observation; and means for operating said receiver in synchronism with said reproducers and said television camera and including means for supplying synchronizing energy pulses to said television camera, said reproducers, said camera means and said receiver.

3. A system for making color motion picture film which comprises a multibeam television camera including a lens system, means for dividing the image carrying light beam emerging from said lens system directed at a scene into a plurality of component beams, a plurality of light sensitive electron screen elements for translating light energy into video signals, means for scanning said screen elements with a plurality of respective electron beams in synchronism, and means for focusing said component beams through a plurality of different color filters upon respective ones of said screen elements; a plurality of television reproducers each having screen means for exposure to a camera; means including an amplifier for operating each of said reproducers in synchronism with the others from respective one of said video signals; a motion picture camera means having recording areas each associated with a respective one of said reproducers for recording on film the image on said screen means of the respective reproducer representing one of the different color aspects of the scene to be photographed; means for supplying synchronizing energy pulses to said television camera, said reproducers and said camera; means to adjust said amplifier output for controlling the intensity of the images on said screen means; and means for automatically adjusting the amplifier output in accordance with the amplitude of the video signal, said adjusting means responding to a variable setting for correspondingly varying the contrast of the images on said screen means.

4. A system for making color motion picture film which comprises a multibeam television camera including a lens system, means for dividing the image carrying light beam emerging from said lens system directed at a scene into a plurality of component beams, a plurality of light sensitive electron screen elements for translating light energy into video signals, means for scanning said screen elements with a plurality of respective electron beams in synchronism, and means for focusing said component beams through a plurality of different color filters upon respective ones of said screen elements; a plurality of television reproducers each having screen means for exposure to a camera; means including an amplifier for operating each of said reproducers in synchronism with the others from respective one of said video signals; a motion picture camera means having recording areas each associated with a respective one of said reproducers for recording on film the image on said screen means of the respective reproducer representing one of the different color aspects of the scene to be photographed; a monitoring television receiver having screen means for visual observation; and means for operating said receiver in synchronism with said reproducers and said television camera and including means for supplying synchronizing energy pulses to said television camera, said reproducers and said receiver.

LAURISTON E. CLARK.

REFERENCES CITED

The following references are of record in the file of this patent:

UNITED STATES PATENTS

| Number | Name | Date |
|---|---|---|
| 2,073,370 | Goldsmith | Mar. 9, 1937 |
| 2,275,898 | Goldsmith | Mar. 10, 1942 |
| 2,294,820 | Wilson | Sept. 1, 1942 |
| 2,335,180 | Goldsmith | Nov. 23, 1943 |
| 2,373,114 | Goldsmith | Apr. 10, 1945 |
| 2,389,646 | Sleeper | Nov. 27, 1945 |
| 2,402,096 | Somers | June 11, 1946 |
| 2,420,029 | Brady | May 6, 1947 |